(12) United States Patent
Jansseune et al.

(10) Patent No.: US 6,605,939 B1
(45) Date of Patent: Aug. 12, 2003

(54) INDUCTIVE MAGNETIC SATURATION DISPLACEMENT SENSOR

(75) Inventors: Luc Jansseune, Venerque (FR); Bernard Genot, Saint Marcel Paulel (FR); Yves Dordet, Fonsorbes (FR); Guy Bonhomme, Frouzins (FR); Michel Boucard, Tournefeuille (FR); Laurent Satge, Ramonville Saint Agne (FR)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 0 days.

(21) Appl. No.: 09/658,060

(22) Filed: Sep. 8, 2000

Related U.S. Application Data
(60) Provisional application No. 60/152,790, filed on Sep. 8, 1999, and provisional application No. 60/152,791, filed on Sep. 8, 1999.

(51) Int. Cl.$^7$ ................................................ G01B 7/14
(52) U.S. Cl. ............................ 324/207.16; 324/207.24
(58) Field of Search .......... 324/207.26, 207.15–207.17, 324/207.24, 253; 33/361; 336/232, 200

(56) References Cited

U.S. PATENT DOCUMENTS

| | | | |
|---|---|---|---|
| 4,774,465 A | 9/1988 | Nilius | 324/208 |
| 5,204,621 A | 4/1993 | Hermann et al. | 324/207.18 |
| 5,278,500 A | * | 1/1994 | Seitz | 324/249 |

FOREIGN PATENT DOCUMENTS

| | | |
|---|---|---|
| DE | 2511683 | 9/1976 |
| DE | 3914787 | 8/1990 |
| DE | 3914787 | 11/1990 |
| DE | 4103603 | 8/1991 |
| DE | 4205957 | 9/1993 |
| DE | 4311973 | 2/1997 |
| DE | 19621886 | 4/1997 |

* cited by examiner

*Primary Examiner*—N. Le
*Assistant Examiner*—Reena Aurora

(57) ABSTRACT

A sensor system includes a coil positioned on a thin substrate sandwiched to a layer of mumeta, a high magnetic permeability material. The mumetal acts as an amplifier for the inductance L measured at the terminals of the coil. When a magnet passes in front a sheet of mumetal, its magnetic field locally saturates the mumetal whose magnetic permeability collapses on the saturated surface. The result is a reduction of the inductance factor (L) in proportion with that area of the coil covered by the saturated mumetal. This reduction in inductance is measured at the coil terminals to provide an estimation of that area of the coil that has been covered. By determining a particular layout of the coil, mumetal, and magnet, a predetermined electrical signal of inductance or coupling variations corresponding to movement of the magnet is provided.

18 Claims, 11 Drawing Sheets

INDUCTIVE MAGNETIC SATURATION DISPLACEMENT SENSOR

The present application claims priority to U.S. Provisional Patent Application Ser. No. 60/152,790, filed Sep. 8, 1999; U.S. Provisional Patent Application Ser. No. 60/152,791, filed Sep. 8, 1999; French Patent Application Ser. No. 99 13431, filed Oct. 27, 1999; French Patent Application Ser. No. 99 13434, filed Oct. 27, 1999; French Patent Application Ser. No. 99 13436, filed Oct. 27, 1999; and French Patent Application Ser. No. 99 13437, filed Oct. 27, 1999.

BACKGROUND OF THE INVENTION

The present invention relates to an position sensor, and more particularly to a sensor used in the automotive industry to detect the position of various mechanical or control components, such as steering column, light switches, windshield wiper switches, etc.

There exists a need to know the position of mobile levers, such as those used to control a vehicle or to monitor its levels, for example, fuel or other motor fluids. The increased number of electronic components used in modem vehicles also increases the need to access a greater number of mechanical operating parameters, such as the position of levers or activating devices, the torque applied to the drag link, the position of the shift lever, etc.

Current technology makes use of resistive potentiometers. In order to increase reliability, it would be preferable to replace this type of sensor by no-contact sensors, without, however, increasing their cost. One such sensor relates to a device that includes a measuring coil encased between two, opposite polarity field coils installed on a cylinder (or flat plate) which has a V-shaped internal plate made of ferromagnetic material, and in which slides a small magnet. Inside this core, the magnet generates a saturation area that interrupts the lines of the field created by the field coils, thereby modifying each one of them in the signal measured at the terminals of the measuring coil. The magnet is then attached to the moving part whose travel one wishes to measure. In the case of the flat form of the device, the small magnet moves upon contact with a protective and frictionless layer between two coils, and here also, the measurement is obtained differentially. This type of device is not suitable for remote or cross-panel position measurements. Furthermore, construction of the cylindrical version of the device is relatively complex, whereas the flat version produces unwanted friction.

The purpose of the present invention is to eliminate the aforementioned inconveniences by providing a no-contact analogue position sensor that can be manufactured economically, easily installed and has the ability to measure a position through a separation.

SUMMARY OF THE INVENTION

The present invention involves the use of a coil to create inductance, the coil being positioned on a thin substrate sandwiched between two (or at least one) layers of mumetal-type (high magnetic permeability) material. In the following description, the term "Mumetal" shall be generically used to designate any materials having analogue magnetic properties (i.e., high magnetic permeability; for example, 100,000 times that of air, and low saturation field; for example, 0.8 Tesla)

The mumetal acts as an amplifier for the inductance L measured at the terminals of the coil (magnetic field storage effect). When a magnet passes in front a sheet of mumetal, its magnetic field locally saturates the mumetal (the composition of which is selected to allow saturation by a relatively weak field), whose magnetic permeability collapses on the saturated surface.

The result is a reduction of the inductance factor (L) in proportion with that area of the coil covered by the saturated mumetal. This reduction in inductance is measured at inductance terminals, thereby giving an estimation of that area of the coil that has been covered by the saturated mumetal.

Two parallel coils, positioned between each layer of mumetal, can also be used; one being powered by alternating current, and the other connected to the terminals of a voltage measuring device. In this case, the mumetal promotes the coupling between the two coils. The saturation of the mumetal by the magnetic field of the magnet produces a coupling variation proportionate to the area of the coil that has been covered with saturated mumetal, which can be measured at the terminals of the second coil.

By determining the appropriate design and layout of the coil, mumetal and magnet, one can obtain an electrical signal (inductance or coupling variations) corresponding to the movement of the magnet in a predetermined direction.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
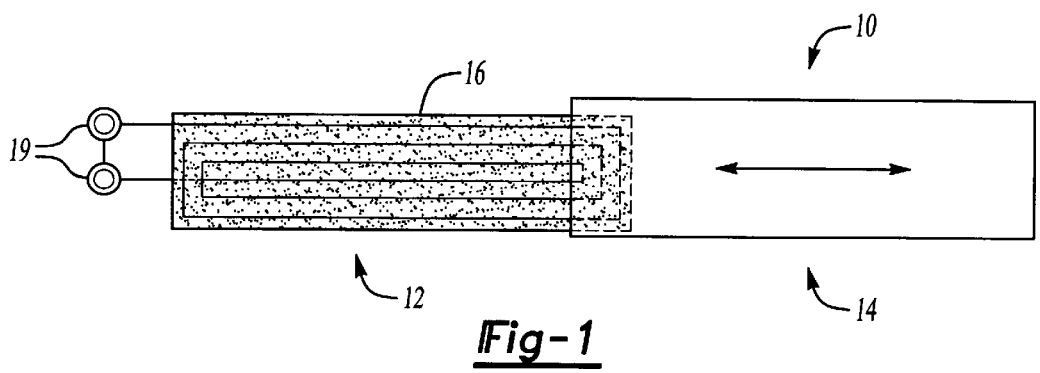
FIG. 1 represents a schematic view of a position sensor according to the invention.

FIG. 1 illustrates a sensor system 10 for a vehicle. The system 10 generally includes a first part 12 comprising the sensor itself, whereas a second part 14 is preferably integrated to the mobile element whose movement is to be measured.

The sensor 10 is composed of a traditional multi-layer circuit board derived from a sheet of any substrate material 16 traditionally used in this domain, such as epoxy glass (rigid), or polyamides (flexible). In the present, but non-restrictive, example, the substrate sheet is several centimeters long, 1 centimeter wide, and 0.1 mm thick.

This substrate sheet 16 includes an elongated, spiral-wound coil that is, for example, ten times longer than wide. In a preferred embodiment, this coil shall have a large number of turns, since inductance is proportionate to the square of the number of turns. We use a spiral-wound coil in order to increase the magnetic fields created by the concentric windings, as opposed to reducing it twofold.

The flat coil 18 having an essentially elongated rectangular shape, each of its extremities is provided with an area allowing the windings to be folded back, and where inductance is not proportional to the longitudinal dimension of the coil 18.

Figure 3:
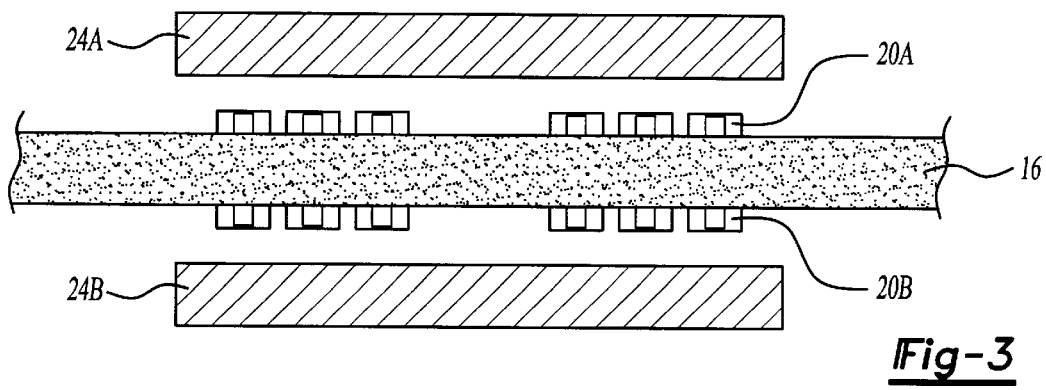
FIG. 3 is a sectional view of the components of a sensor equipped with two parallel windings.

The coil 18 typically includes one or more windings (FIG. 3 at 20A, 20B) with a half-dozen turns each, and a conductive path is provided in the center of the coil for the connection of either another winding, or an electronic device. The distance between the winding strips is preferably approximately 50 to 150 microns, as is their width. In the present example, their thickness varies from 5 to 40 microns.

According to the invention, the sensor uses a coil 18 with multiple tandem windings 20 positioned in parallel layers in order to increase inductance and reduce the non-linear effects in the fold-back areas 22. However, multiple coil and substrate layers leads to an increase in production costs as well as an increase in the magnetic resistance of the unit. Whereas induction is inversely proportional to said magnetic resistance. It is therefore preferable to limit the number of layers of insulation.

Figure 4:
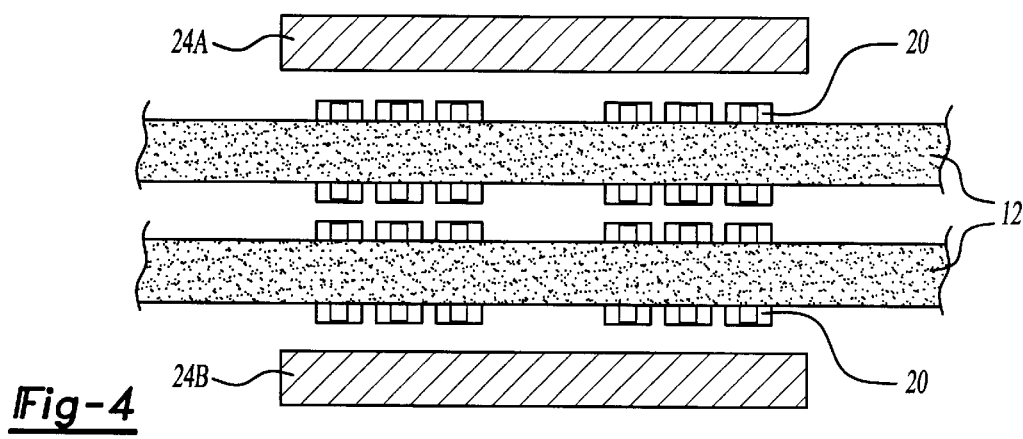
FIG. 4 illustrates in the same manner a sensor equipped with four windings.

The present example uses a coil 18 with two parallel windings (FIG. 3 at 20A, 20B) placed on either side of the substrate sheet 16. Obviously, coils including four or more windings 20 can be used according to need (FIG. 4).

As previously indicated in one particular embodiment, two coils can be used whose inductive coupling is modified according to the proportion of the magnet situated above the core layer. These coils can be positioned on either side of the substrate 12 in a pattern similar to that shown in FIG. 3, or interlaced on the same side of the substrate.

The sensor 10 also has two layers 24A, 24B of ferromagnetic material (which will be referred to as "core layers" in the remainder of this descriptive notice), typically made of mumetal, and positioned on either side of the circuit board 16. A conventional insulating material (not shown) shall preferably be inserted between the winding strips 20 of the coil 18, and above said windings 20.

The thickness of each core layer 24A, 24B is preferably minimal, (between 20 and 50 microns), in order to avoid the formation of eddy currents. The thickness of these core layers 24 can range from several angstroms to tens of microns. In order to minimize thickness, the core layer 24 can, at least for some types of ferromagnetic materials, be applied in a vacuum.

Hence, we obtain a sensor 10 with an external core, since the core layers 24A, 24B of ferromagnetic material are located on the outer surface of the coil 18. Note that the use of a single core layer 24 leads to a relatively poor signal-to-noise ratio. It is therefore preferable to use two core layers 24A, 24B in order to cover both sides of the coil 18, regardless of the number of parallel windings 20 used, in order to improve this signal-to-noise ratio. However, should certain specific practical considerations require the use of a single core layer 24, this option remains open.

With respect to the ferromagnetic materials used, at least three groups of materials comply with the aforementioned requirements. First of all, there is the mumetal group of alloys per se which are composed of nickel and iron. A second group consists of an amorphous metal obtained through ultra-high speed tempering. Finally, a third group consists of a cobalt-based nano-crystalline material. Some examples of these materials are known by the commercial names of Pernaloy, Ultraperm, and Finmec.

Figure 2:
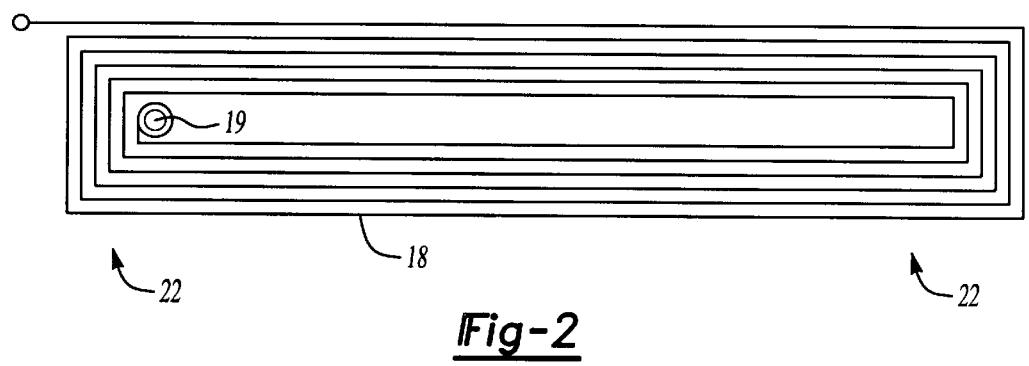
FIG. 2 represents the elongated spiral-wound coil used by the sensor.

The core layers 24A, 24B only cover the central part of each side of the coil 18, not its extremities 22 (FIG. 2) in order to avoid non-linear problems in areas 22 in which the relative travel of the magnet does not lead to a variation in inductance in proportion with the longitudinal distance. It is preferred to take these extremities 22 into account, or to weaken their inductance by not covering them with mumetal when manufacturing the sensor.

The length of each core layer 24 is essentially the same as that of the linear surface of the coil 18. In order to create a Faraday cage, the core layers 24 are connected to the electrical grounding system of the signal-processing device. This connection is provided for the surface area of the core layers 24 facing the coil 18.

Figure 5:
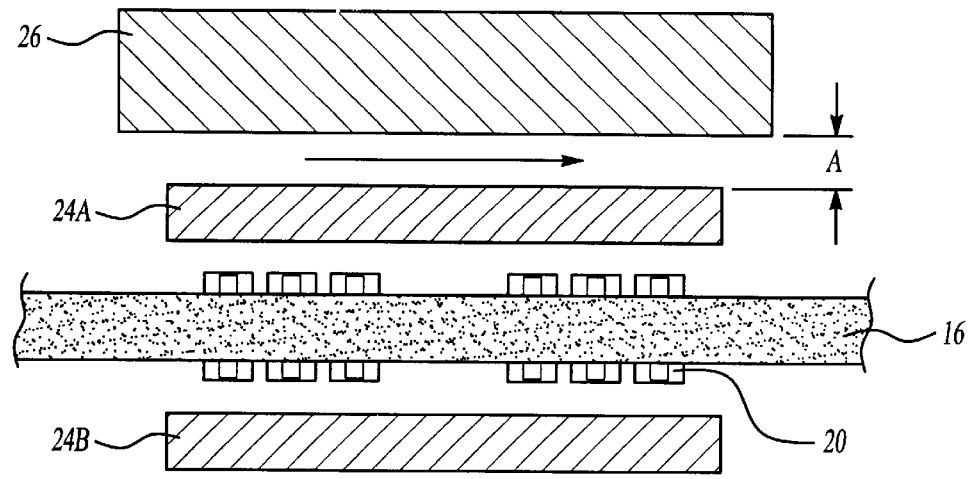
FIG. 5 is a sectional view of the sensor and the mobile magnet.
Figure 6:
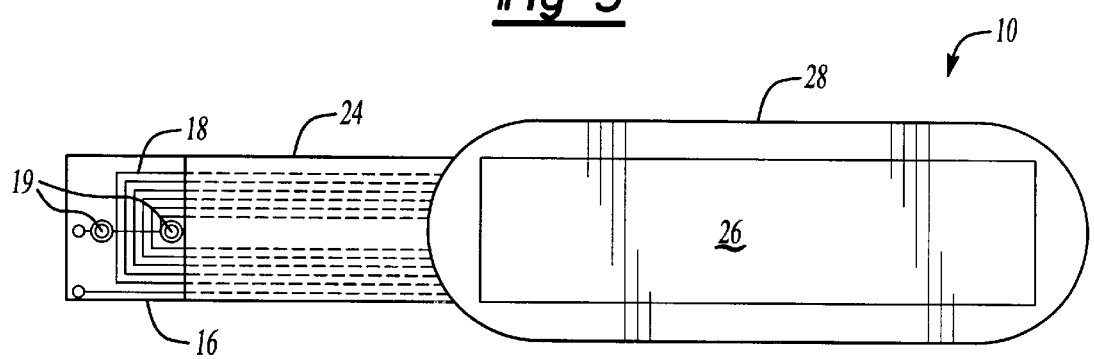
FIG. 6 is a top view of the saturation area generated by the magnet during its travel.

Referring to FIG. 5, the core layers 24 should be positioned as close as possible to each other. This is why a very thin coil 18 and very thin substrates 16 are used. The second (or mobile) part 14 (FIG. 1) of the incremental position sensor includes a magnet 26 that generates a saturation area where the generated field is greater than the saturation field of the core layer(s) 24 in the plane of the mumetal layers 24, whose surface area is essentially the same as that of the mumetal layer 24 (FIGS. 5 and 6) covered by the magnet (in proportion to the longitudinal travel ofthe magnet). The saturation of the core does, in fact, locally eliminate the field lines, thereby reducing the overall inductance of the coil.

During operation, when the magnet 26 travels longitudinally along the X axis, the surface of the ferromagnetic material of the core layers 24A, 24B saturated by the magnetic field varies proportionately with the longitudinal travel of the magnet 26, effectively giving a simple measurement of this travel through the variations in inductance of the coil 18. We can effectively obtain a measurement by evaluating the rate of recovery of a core layer, as opposed to previous technology where a magnet was used to "split" the coil at various positions.

Since the signal obtained at the terminals 19 of the receptor coil 18 is then processed by any known type of electronic device, details thereto will not be further disclosed herein. Such a signal processing device can be advantageously installed on the same substrate 16 as that holding the coil 18, be it to simplify the manufacturing process, or to better integrate the components.

If two coils are used, (intertwined and placed on the same side of the substrate 16, for example), the device acts as would an external core transformer, and the saturation of the mumetal by the magnetic field generated by the magnet reduces the coupling coefficient between the coils in proportion with the surface area of the core layer covered by the magnet. Since one of the coils is supplied with alternating current, the measurement of the signal at the terminals of the other (receptor) coil corresponds to the travel of the magnet.

The type of magnet 26 used has been selected to provide a magnetic field that ensures saturation of substantially all of the core layer 24 that it covers. The actual dimensions of the magnet 26 are less important than the dimensions of the area in which it produces a field of greater magnitude than the saturation factor of the core layers 24.

The minimum width of the totally saturated area 28 must be greater than the active width of the mumetal-covered coil, field variations due to climatic conditions or mechanical/ dimensional tolerances notwithstanding, in order to limit the effects of these errors on the measurement.

Typically, two types of magnet can be used. In one case, a powerful magnet 26 is selected to generate a strong magnetic field, so that its dimensions can be reduced. This type of magnet 26 can be derived from a neodymium/iron/ boron alloy. A second type of magnet can be used where its much weaker field allows it to have essentially the same size as the core layers 24. These magnets can either be made of plastoferrite or nanoferrite. The advantage of using plastoferrite is obviously its ability to be molded into a multitude of shapes.

The magnet 26 is approximately one millimeter thick, depending on its composition. The magnetic flux of the magnet 26 can be either parallel or perpendicular to the core layers 24A, 24B made of ferromagnetic material.

Interestingly enough, the air gap (distance A FIG. 5) between the magnet 26 and the coil 18, which naturally depends upon the type of magnet 26 used, can be much larger than the thickness of the sensor 10 composed of the coil 18 and the two core layers 24A, 24B (an air gap of 1 to 15 mm is obtained in the present example). It is therefore possible to insert a secondary material between the magnet 26 and the sensor 10 without hindering operation of the sensor 10. This peculiarity allows the moving part 14 to be installed inside equipment, while the sensor 12 (FIG. 1) remains outside of the equipment, as long as the separation is made of a non-magnetic material such as aluminum or plastic. One can understand that this type of layout is particularly advantageous for measuring a position inside a housing, reservoir, etc.

Figure 7:
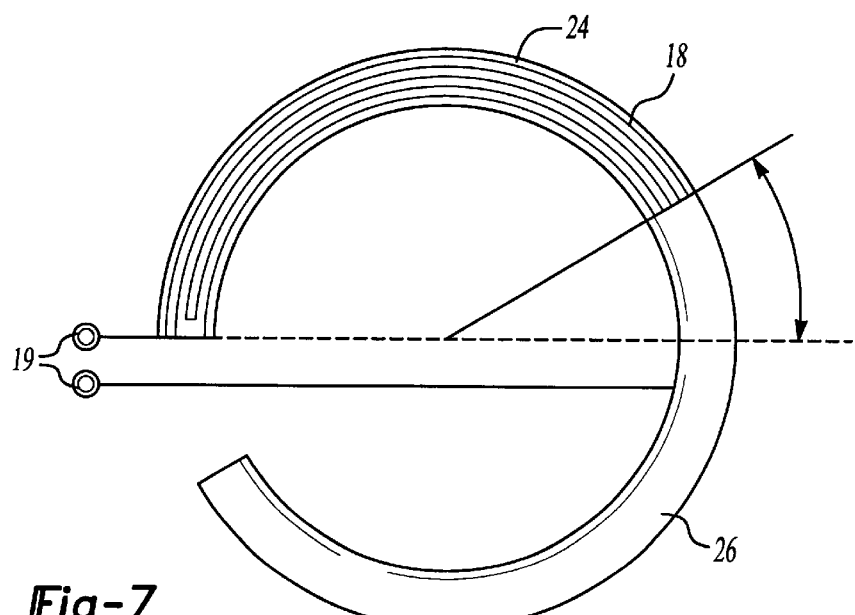
FIG. 7 is a top view of an angular movement-measuring sensor according to the invention.

In an embodiment designed to measure angular movement, a sensor shown in FIG. 7 is preferred. In this case, a coil in the shape of a 180° C. arc is covered with semicircular core layers 24. The magnet 26, also in the shape of a 180° C. arc, is concentric with the coil 18. The measuring principle remains the same as that mentioned above.

Figure 8A:
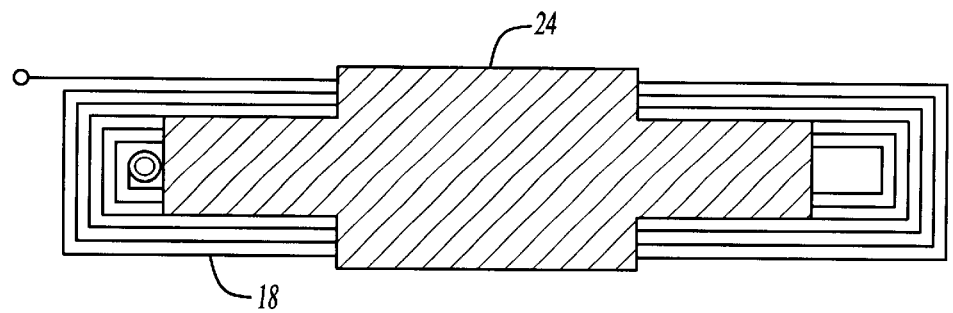
FIGS. 8A and 8B illustrate an optional core layer design, and its corresponding output signal.
Figure 8B:
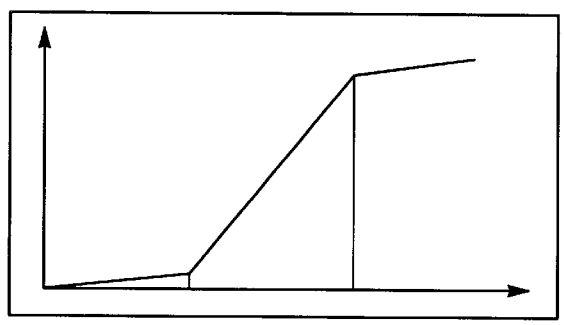
Figure 9A:
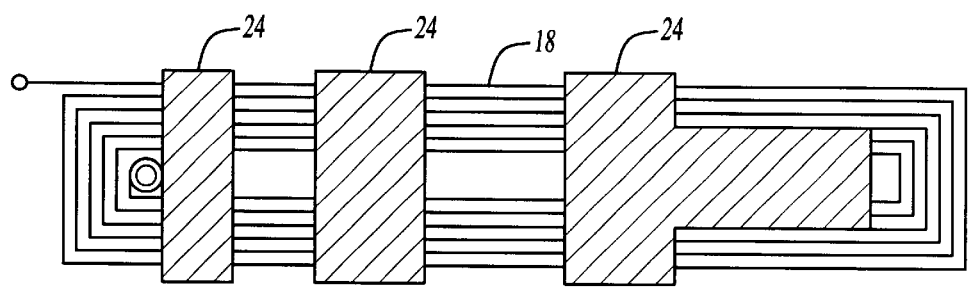
FIGS. 9A and 9B illustrate an optional core layer design, and its corresponding output signal.
Figure 9B:
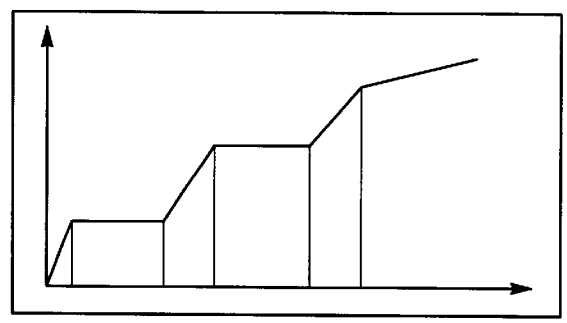

Referring to FIG. 8A, an output signal having a range or series of ranges (FIG. 9A), which allow, for example, a more precise reading in a small range, without having to take into consideration movements outside of that range. This case can, for example, be applied to the detection of the position of a shift lever, and the approximation of the position of that lever to a position corresponding to a gear determined by a given signal. In this case, the shape of the core layer 24 is, for example, similar to those indicated in FIG. 8A or 9A. As shown in FIG. 9A, it is permissible to use multiple, equally spaced, coplanar surfaces to create the core layer 24.

Figure 10:
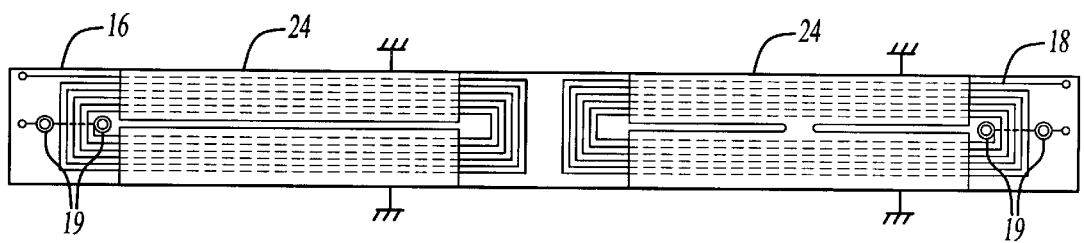
FIG. 10 illustrates an optional sensor design using two coils end-to-end.

Referring to FIG. 10, another embodiment uses two identical coils 18, 18 of same width placed end-to-end. Preferably, these two coils 18, 18' are wound in opposite directions, in order to eliminate the effect of mutual inductance between them. Layers of ferromagnetic material 24, 24 are then used to cover the linear areas of these coils 18, 18'.

In this case, the travel of, for example, a weak magnet 26 with a surface area essentially identical to that of a coil 18, is detected by measuring the difference between the signals emitted by the two coils. This half-bridge measurement is often used to compensate inductance tolerances dimensions, ferromagnetic materials, magnet-to-coil distance, etc.), in order to compensate for the effects of temperature (variations in magnetic field generated by a magnet under variable climatic conditions), and the tolerances in the area of saturation.

Figure 11:
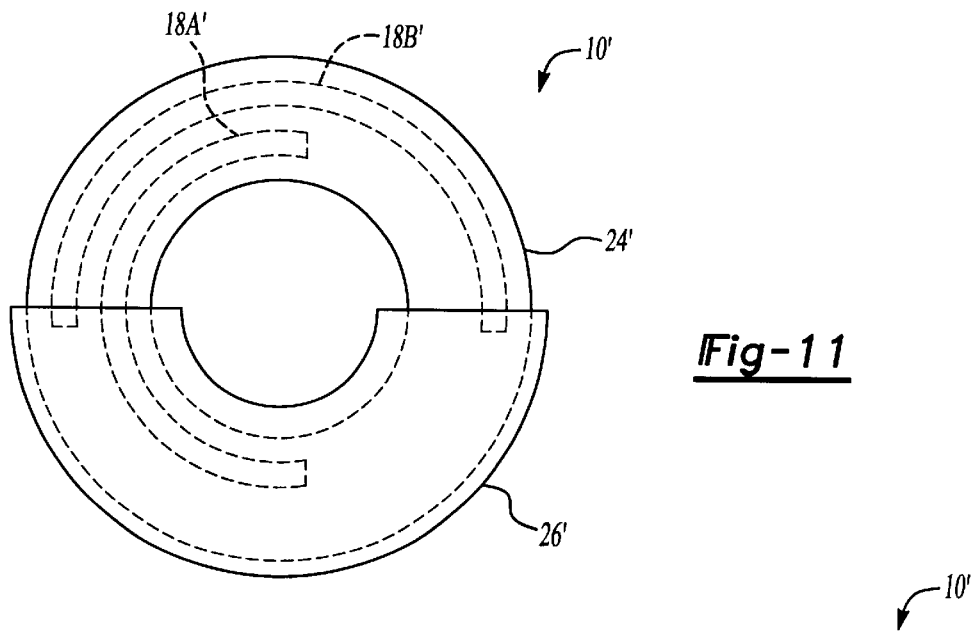
FIG. 11 illustrates an optional sensor designed for the measurement of angular movement over a 360° radius.

FIG. 11 illustrates the embodiment of a sensor 10 designed to measure angular movement over 360°. In this case, two 180° sensors, like those described above, but at a 90° offset. The 180° sensors are of the differential type, or optionally, error compensation can be calculated using the covered angular area of the receptor coils 18'A, 18'B) at 90°. The magnet 26 has the shape of a 180° arc and is concentric to the coils 18'.

A 360° sensor can also be obtained by using three 120° coils 18 and a 120° magnet 26. This layout avoids the problems of mutual inductance between the internal and external coils of the 180° sensor.

Figure 12A:
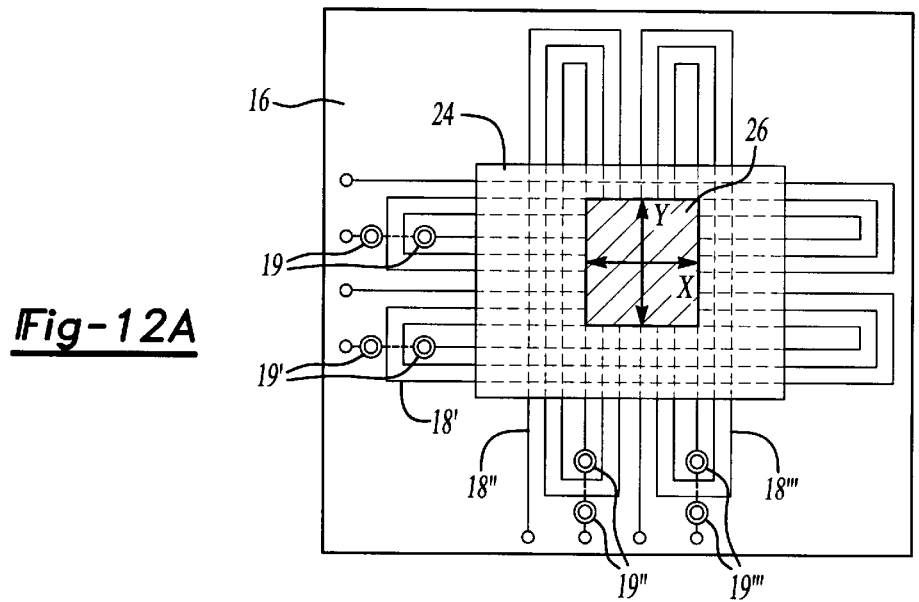
FIGS. 12A and 12B illustrate two embodiments of two-directional position sensor.

Referring to FIG. 12A, two-directional sensors can be produced. This type of two-directional sensor includes two perpendicular units, each equipped with two parallel coplanar coils (18, 18, 18, 18) and one essentially square magnet 26 that travels inside the covered areas of the coil assemblies.

Figure 12B:
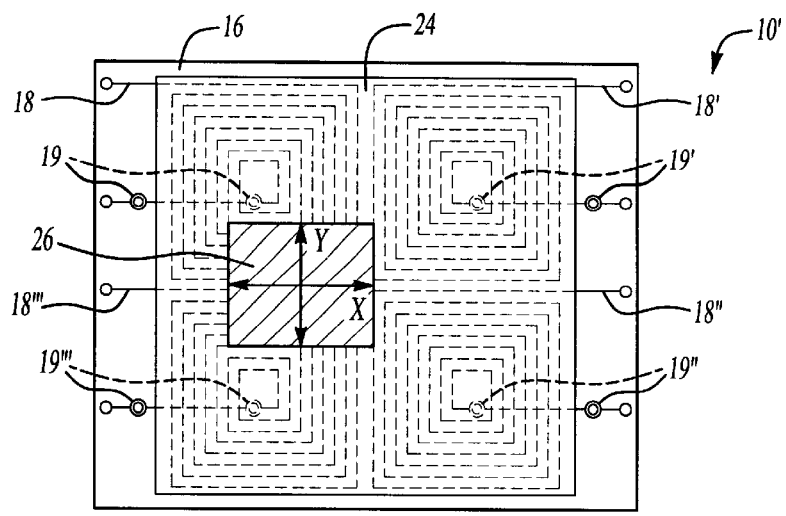

In yet another embodiment illustrated in FIG. 12B, four essentially square coils form a square, a core layer covers all of the coils, and a magnet the size of each coil travels over said coils.

Another design option consists in creating a flexible linear sensor for angular measurement by adapting said sensor to the circumference arc of a cylinder. This design produces a very compact angular sensor.

More generally speaking, another embodiment allows position measurements to be taken inside an enclosed space by applying a coil 18 to a flat sheet, then adapting said sheet to the enclosure. In this case, a plastoferrite magnet 26 can be adapted to the required shape.

In yet another embodiment, a stationary magnet is placed on one of the surfaces of the coil 18, and a second magnet 26 of opposite polarity is moved along the opposite surface of the coil 18, thereby de-saturating the coil 18 wherever the two magnets come face-to-face. The measurement principle is once again based on the variations in inductance measured at the terminal of the coil 18, or tandem multiple coils 18, 18'.

In all of the embodiments previously described, it is best to split the core layer in half in order to avoid the formation of eddy currents in the mumetal. To do this, we trace a groove in the core layer 24 covering the coil 18 that traverses the middle of the coil 18, thereby separating the core layer 24 into two coplanar halves that cover, respectively, their part of the turns in which the current circulates in opposite directions. This reduces the eddy currents generated by the current circulating in the coil 18. Appropriately, this groove only creates a partial separation, since an electrical link remains between the two halves of the core layer 24, preferably in the middle, in order to ensure sufficient electrical ground continuity for electromagnetic shielding purposes. Both of these designs are illustrated in FIG. 10.

Figure 13:
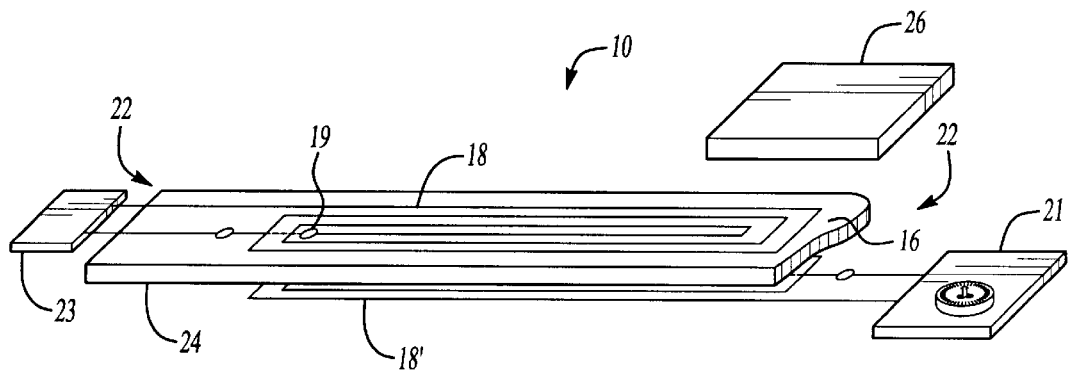
FIG. 13 represents a schematic view of a position sensor for measurement by differential coupling.

Referring to FIG. 13, the sensor 10 is a multi-layer, composite circuit board (FIG. 3) composed of a core layer 24 of very elongated ferromagnetic material around which are placed two coils 18, 18', 18, 18'.

In one particular embodiment (FIG. 2), the coils 18, 18', 18, 18' consist of very elongated copper runs, on a sheet of insulated synthetic substrate 16, 16' such as epoxy or polyamide. In the present, but non-restrictive, example, each sheet of substrate 16, 16' is several centimeters long, approximately 1 centimeter wide, and 0.1 mm thick.

Each sheet of substrate 16 has an elongated, wound flat coil 18 which, for example, is ten times longer than it is wide. In a preferred embodiment, this coil has a large number of windings, since inductance is known to be proportionate to the square of the number of windings. A wound coil is used to increase the magnetic field produced by the concentric windings, as opposed to reducing it twofold. The flat coil 18, usually shaped like an elongated rectangle, has at each end an area 22 where the windings are folded back and where inductance is not proportional to the longitudinal dimension of the coil 18.

Figure 14:
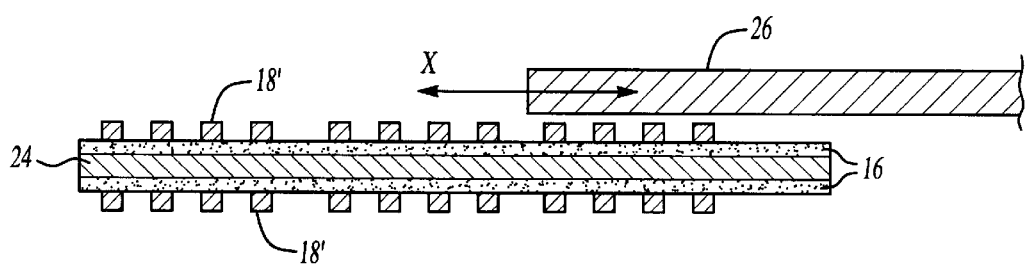
FIG. 14 is a sectional view of the components of the sensor.
Figure 15:
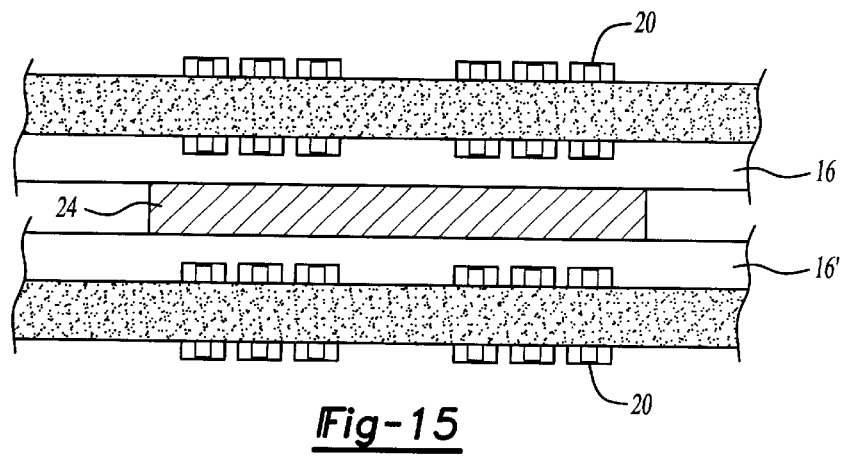
FIG. 15 illustrates the embodiment of a sensor using coils with multiple parallel windings.

In the embodiment shown in FIG. 14, coils 18, 18' with multiple parallel windings 20 are used in order to increase the mutual inductance of the windings 20 and reduce the non-linear effect on the fold-back areas 22 (FIG. 13). On the other hand, the addition of coil windings and substrate is known to increase both production costs and the magnetic resistance of the assembly. Whereas inductance is inversely proportional to said magnetic resistance. It is therefore preferable to limit the number of isolating layers.

Each winding 20 typically includes half-dozen spires, and a conductive path 19 extends from the coil 18 for connection to another winding or to an electronic device. The distance between the winding paths, as well as their width, is approximately 50 to 150 microns. Their thickness is, in this example, between 5 and 40 microns. The core layer 24 which separates the substrates 16, 16' of the coils 18, 18' is composed of a ferromagnetic material having a high permeability factor (typically more than 100,000 times that of air) and low saturation field typically 0.8 T). The highly permeable material can, for example, be made of mumetal, a glassy alloy (also known as metallic glass), or a nanocristaline alloy. The core layer 24 is about 20 to 50 microns, in order to permit its saturation by a weak external magnetic field. The thickness of these core layers 24 can go from several angstroms to tens of microns. In order to minimize its thickness, the core layer 24 can, in the case of certain types of ferromagnetic material, be applied in a vacuum.

This unit is composed of a thin plate having a thickness of, for example, approximately 0.5 mm. The core layer 24 is only applied between the central parts of the coils 18, 18' and not between their ends 22 (FIG. 13) in order to avoid non-linearity problems in these areas 22 for which a back-and-forth magnet movement does not lead to a inductance variation proportionate to the longitudinal distance.

The length of the core layer 24 is preferably approximately equal to the length of the linear area of the coil 18. The first coil 18 is linked to an alternating current power supply (sinusoidal, triangular, square or other, as long as it generates a variable magnetic current (shown schematically at 23)). The second coil 18' is linked to a traditional voltage-measuring device (shown schematically at 21). The sensor 10 is designed to be used in conjunction with a magnet 26 attached to a corresponding mobile part which, when passing by, comes close enough for the magnetic field generated by the magnet 26 to locally saturate the core layer 24.

The magnet 26 used in this example was selected for its ability to create a magnetic field capable of saturating essentially all of the core layer 24. The actual dimensions of the magnet 26 are less important than the dimensions of the area in which it creates a field of greater magnitude than the saturation factor of the core layers 24.

During operation (FIG. 13), alternating current is applied to the terminals of the first coil 18 (the supply coil), and the measuring device indicates the signal obtained at the terminals of the second coil 18' (the receptor coil). The core layer 24 senses the magnetic field created by the passing of alternating current through the first coil 18, and the signal observed at the output of the second coil 18 is therefore extremely weak. The coupling coefficient between the two coils 18, 18' is then very close to zero. However, when a magnet 26 approaches the assembly, its magnetic field locally saturates the core layer 24 according to the position and characteristics of the magnet 26.

When the core layer 24 is saturated, its permeability is considerably reduced in the area of saturation 28 (FIG. 14). Therefore, this core layer 24 no longer acts as a barrier between the two coils 18, 18', the coupling coefficient between the coils increases, and the signal observed at the output of the second coil 18' is significantly higher than in the preceding case.

We can change the surface of the core layer 24 saturated by the magnet 26 by moving the latter along its longitudinal axis X, either by using a large magnet 26 to progressively cover all of the core layer 24, or by using a smaller magnet along with a core layer 24 whose magnetic permeability varies longitudinally.

Position measurement is easily obtained by calculating, with the assistance of an appropriate electronic device, the difference between the voltage applied to the terminals of the first coil 18 and the voltage induced in the second coil 18'. This relationship is directly linked to the position of the magnet 26 with respect to the sensor 10.

Since the signal obtained at the terminals of the receptor coil 18' is processed by any existing type of electronic device, we will not go into those details herein. Suffice to say that such a signal processing device can be advantageously installed on the same substrate 16 as that holding the coils 18, 18', be it to simplify the manufacturing process, or to better integrate the components.

Figure 16:
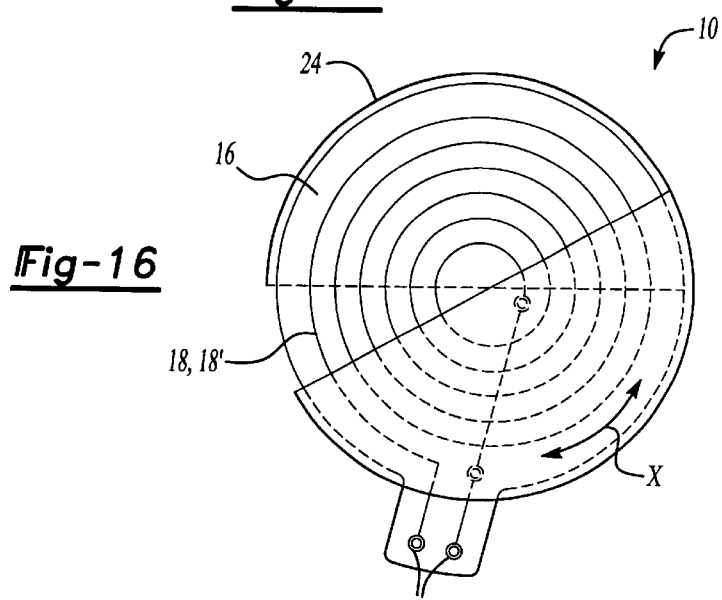
FIG. 16 illustrates the embodiment of an angular displacement sensor.

A device such as that illustrated in FIG. 16 can also be used for angular position measurement. In this case, the two supply/receptor coils 18, 18' are spiral-wound, and the semicircular core layer 24 separates them on half of their surface. A magnet 26, also semi-circular and concentric with respect to the coils 18, 18' and the core layer 24, is mobile and rotates around the axis of the sensor 10. Depending on the angle of travel of the magnet 26, the coupling coefficient between the two coils 18, 18' varies, and is measured.

Figure 17:
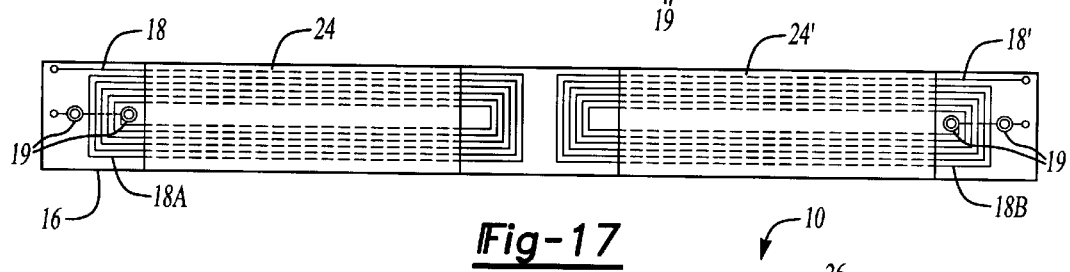
FIG. 17 illustrates the embodiment of a sensor using two coils placed end-to-end.

In another embodiment (FIG. 17), a supply coil 18 on one side and two receptor coils 18, 18' laid end-to-end in the same plane on the other side of the core layer. In a preferred embodiment, these two coils 18A, 18B are wound in opposite directions in order to create a point of zero voltage between them. Core layers 24, 24' made of ferromagnetic material cover the linear areas of these coils 18, 18'.

In this case, the travel, for example, of a weak magnet 26 whose surface area is essentially identical to that of a receptor coil 18, is detected by the measurement of the differential between the signals coming from the two receptor coils (4'A, 4'8). Here, the magnet 26 will increase the coupling factor of one of the receptor coils 18A while simultaneously decreasing that of the other receptor coil 18B.

This type of half-bridge measurement is currently used to compensate for inductance tolerances (coil dimensional errors, ferromagnetic materials, magnetcoil distance, etc.), in order to take into account the effects of temperature (magnetic field variations generated by a same magnet under varying climatic conditions), as well as tolerances on the saturation area.

In a second embodiment, the coils 18, 18' are laid out in an arc. The magnet 26 is also arc-shaped and concentric to the above. The operating principle remains identical to that described previously. In the case of a 360° sensor, two 180° sensors like those described above (FIG. 11) and used and offset at a 90° angle. The 180° sensors are of the differential type, or optionally, error compensation can be calculated using the covered angular area of the receptor coils at 90° The magnet used has the shape of a 180° arc and is concentric to the coils. A 360° sensor can also be obtained by using three 120° receptor coils and a 120° magnet. This layout avoids the problems of mutual inductance between the internal and external coils of the 180° sensor. Optionally, it is also possible to obtain a flexible linear sensor for angular measurements by configuring said sensor along a cylindrical circumference arc. This layout makes it possible to obtain a very compact angular sensor.

More generally, another embodiment allows travel to be measured inside a defined volume by using a coil attached to a flat sheet which, in turn, is adapted to the surface of that volume. In this case, it is appropriate to use a plastoferrite type of magnet, since it can be molded to the required shape.

Figure 18:
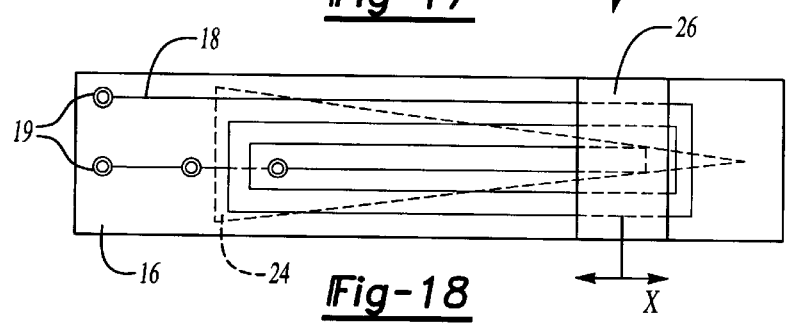
FIG. 18 illustrates another embodiment of a sensor according to the invention, using a variable width core layer.

Referring to FIG. 18, another embodiment involves the use of a sensor 10 whose overall magnetic properties change according to its longitudinal position. The device includes a small magnet 26 with respect to the size of the coils 18, and its longitudinal travel along X is measured by the fact that the core layer 24 has magnetic storage capacity that varies along the travel axis X of the magnet 26.

In this case, the signal measured at the receptor coil 18 terminals varies along the longitudinal X-axis according to the longitudinal position. Variations in the magnetic capacity of the core layer 24 can be obtained through various methods such as: by using a core layer 24 whose width varies along its length, and a magnet 26 having a constant surface area; by using a core layer 24 whose thickness varies along its length; and by changing the proportions of the surface area of the ferromagnetic material having magnetic properties. This can be obtained, for example, by modifying the magnetic properties of part of the mumetal surface.

One way to "de-structurize" the ferromagnetic material through local heating above the point of Curie, i.e., approximately 200° to 500° depending on the material used, in order to break down the crystalline order of the ferromagnetic material. This means destroying the magnetic properties on small geometric areas of the surface of the ferromagnetic material. According to the number of areas destroyed per unit length, we will, in fact, obtain a longitudinal variation in the magnetic properties of the core layer It is possible to create variations in the core layer 24 with respect to the coils 18 by, for example, varying the width of the core layer 24 according to the linear position on the coils 18.

Referring to FIG. 18, an elongated rectangular sensor, we use a triangular (in this case, Isosceles) core layer 24. The response curve (FIG. 19B) obtained when a magnet 26 is moved longitudinally along X decreases progressively as the magnetic field of the magnet 26 progressively saturates an increasingly large surface of the ferromagnetic material of the core layer 24.

Figure 19A:
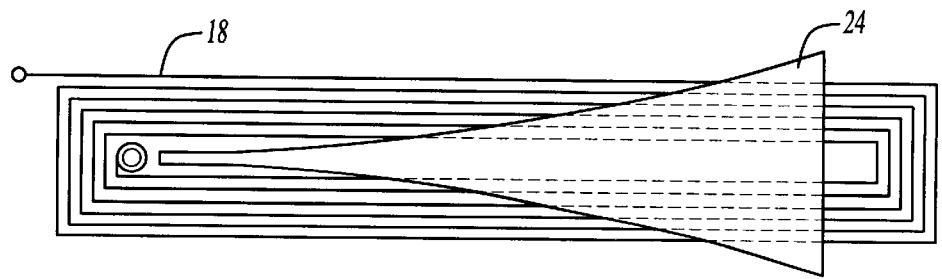
FIGS. 19A and 19B illustrate an optional core layer design and corresponding output signal.
Figure 19B:
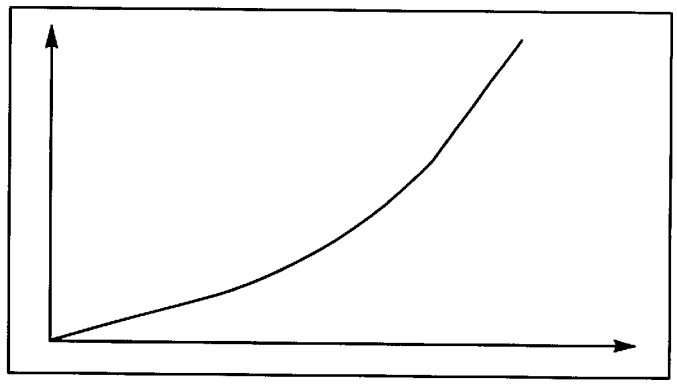
Figure 19C:
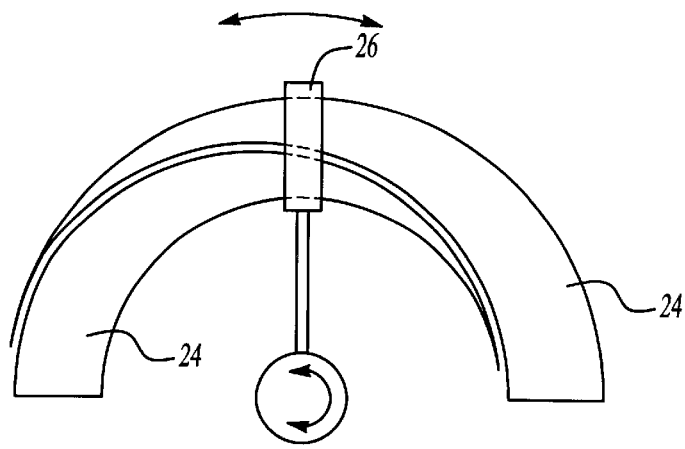
FIG. 19C shows an embodiment of the differential sensor for measuring the angular motion.

Optionally, we use a core layer 24 whose shape becomes progressively narrower along its longitudinal axis (FIG. 19A). It is understood, that it is possible to utilize this concept both with a substantially linear coil 18 and with a coil 18 shaped as an arc of circle FIG. 19C shows an example of a differential sensor for angular measurements) or attached to a surface being controlled. It is obvious that, generally speaking, we can modify the shape of the core layer 24 according to the type of signal we wish to obtain.

Figure 20A:
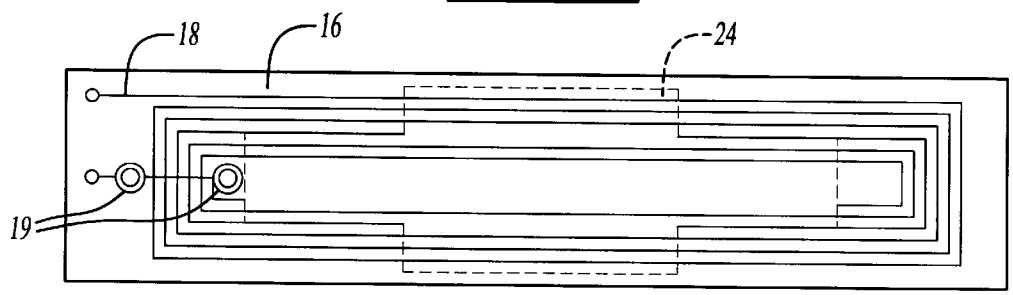
FIGS. 20A and 20B illustrate another optional core layer design and corresponding output signal.
Figure 20B:
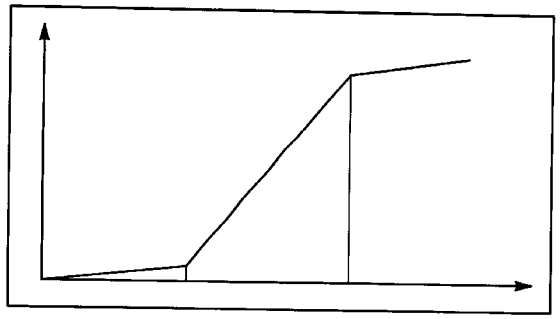
Figure 21A:
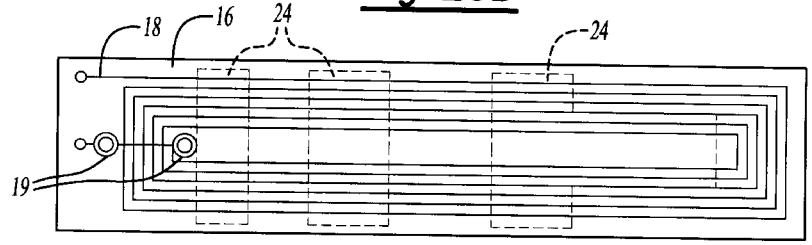
FIGS. 21A and 21B illustrate another optional core layer design and corresponding output signal.
Figure 21B:
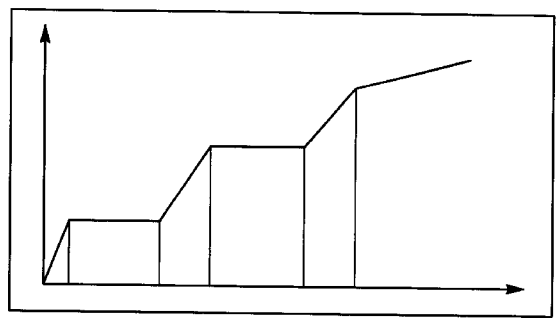

One interesting case concerns an output signal having a range, or series of ranges, which allow, for example, a more precise reading in a small range, without having to take into consideration movements outside of that range. This case can, for example, be applied to the detection of the position of a shift lever, and the approximation of the position of that lever to a position corresponding to a gear determined by a given signal. In this case, for example, the shape of the core layer 24 is similar to those indicated in FIG. 20A or 21A. As shown in FIG. 21A, it is permissible to use multiple spaced coplanar surfaces to create the core layer 24.

Another interesting case includes a locally narrowed core layer 24. This produces a locally minimized coil 18 output signal. It is also optionally possible to vary the thickness of the core layer 24 instead of its width, thereby obtaining once again a core layer 24 whose magnetic permeability varies according to the longitudinal position.

Figure 22A:
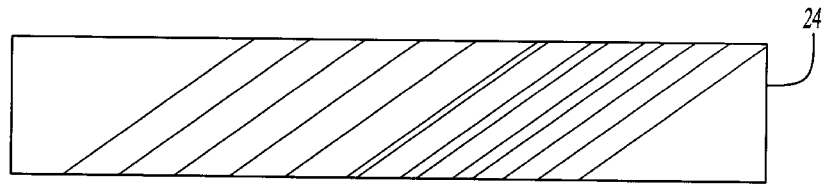
FIGS. 22A and 22B illustrate two optional core layer designs using sub-bands.
Figure 22B:
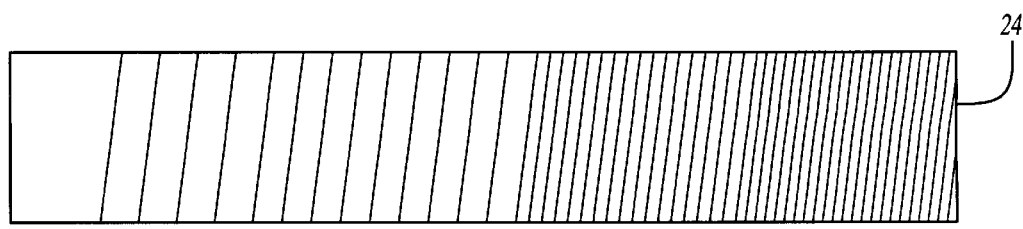

Referring to FIGS. 22A and 22B the creation of sub-bands in the form of parallel hachures, preferably oblique, if one wants to avoid the plateau effect in the output signal, these sub-bands being more or less far apart on the longitudinal plane. All of these subbands are then linked by a continuous border in order to ensure electrical continuity which, for example, helps improve electromagnetic shielding. An optional embodiment of this configuration includes the creation of a grid-like, two dimensional core layer (using, for example, an offset process) where the density of the materials has magnetic properties that vary longitudinally.

Figure 23A:
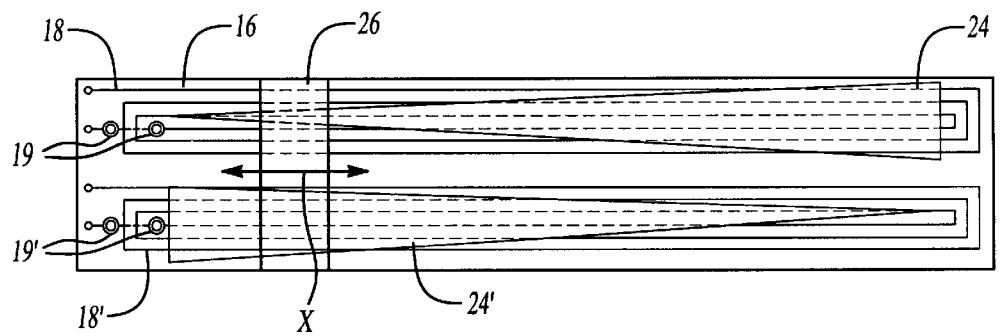
FIGS. 23A and 23B are top views of two optional differential sensors.
Figure 23B:
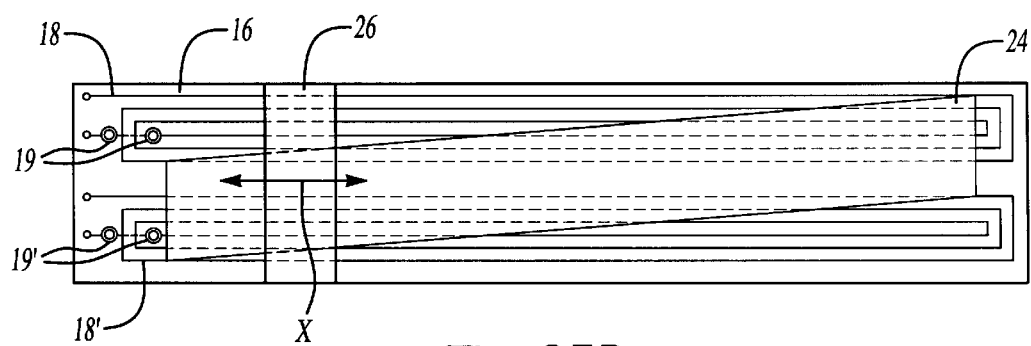

Referring to FIG. 23A, two coplanar parallel coils 18, 18' are separated by triangular core layers 24 placed head-to-foot. Referring to FIG. 23B, a single core layer 24 shaped like an elongated parallelogram covers part of each of the two coils 18, 18', with results substantially identical to those of the preceding device.

Figure 24:
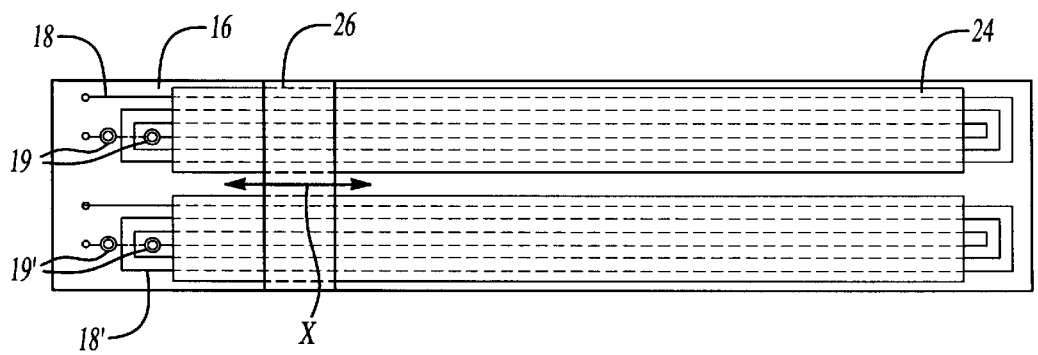
FIG. 24 illustrates another embodiment of a differential sensor where the width of the core layer varies according to each coil.

Referring to FIG. 24, by locally modifying the magnetic properties of the core layer 24, using, for example a spot laser, or by localized application of a large mechanical force, we locally eliminate the magnetic permeability properties of the material. We can then progressively change the density of the treated points along this strip, and once again globally obtain a longitudinally variable magnetic permeability.

The embodiment of this type of differential sensor includes, for example, two coils 18, 18', two rectangular core layers 24, 24', each of which covers a coil in its linear area (it is understood that in all of these embodiments, it is preferable to cover both sides of the coil with a core layer), and each of which has a material density providing longitudinal variations of their magnetic properties, opposite those of the two core layers 24, 24'.

In yet another embodiment of a sensor (not necessarily differential), a local magnetic field is applied to the coil 18 and the core layers 24, by, for example, gluing (or scratching/engraving) a stationary, triangular magnet. In this case the stationary magnet ensures the longitudinally variable saturation of the core layers 24. One particular embodiment of this type is the setting of a sensor during the manufacturing process by positioning the stationary, triangular, magnetic strip according to a predetermined calibration signal that corresponds to a particular position.

Figure 25:
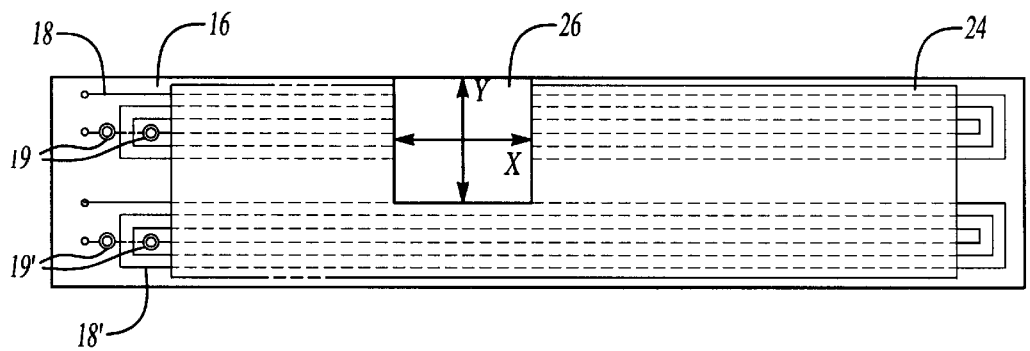
FIG. 25 illustrates a first embodiment of a two-dimensional position sensor.

Referring to FIG. 25, more specifically designed for measuring movement in two perpendicular directions (X, V) (or in one linear and one perpendicular direction), the sensor includes two coplanar, parallel and elongated coils 18, 18', covered with one (or two) core layers 24 with variable, longitudinally "de-structured points".

An essentially square and mobile magnet 26 moves over this core layer 24. It is understood that the longitudinal movement (X direction) is measured from the variations in density of the structured ferromagnetic material of the core layer 24, and that its transversal movement (V direction) is measured from the cover differential between the two coils 18, 18'.

Figure 26:
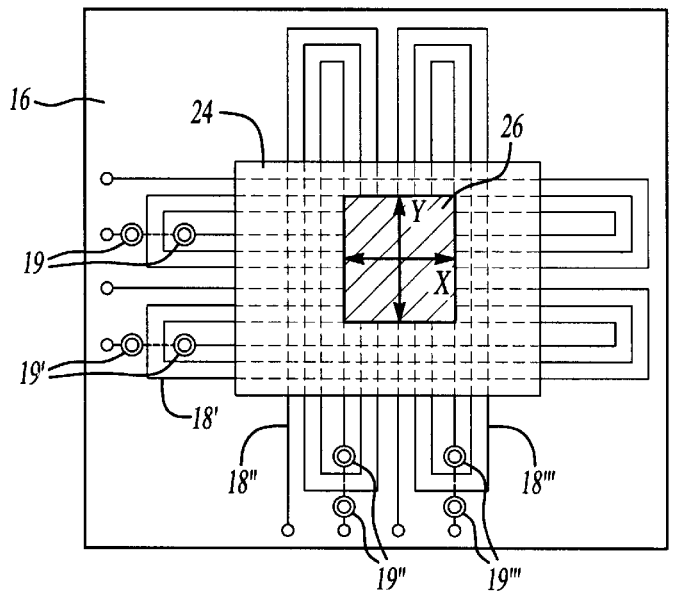
FIG. 26 illustrates a second embodiment of a two-dimensional position sensor.

Referring to FIG. 26, two perpendicular groups, each having two coplanar and parallel coils (18, 18', 18", 18'''), and one essentially square magnet 26 that moves in the area overlapped by the groups of coils.

Figure 27:
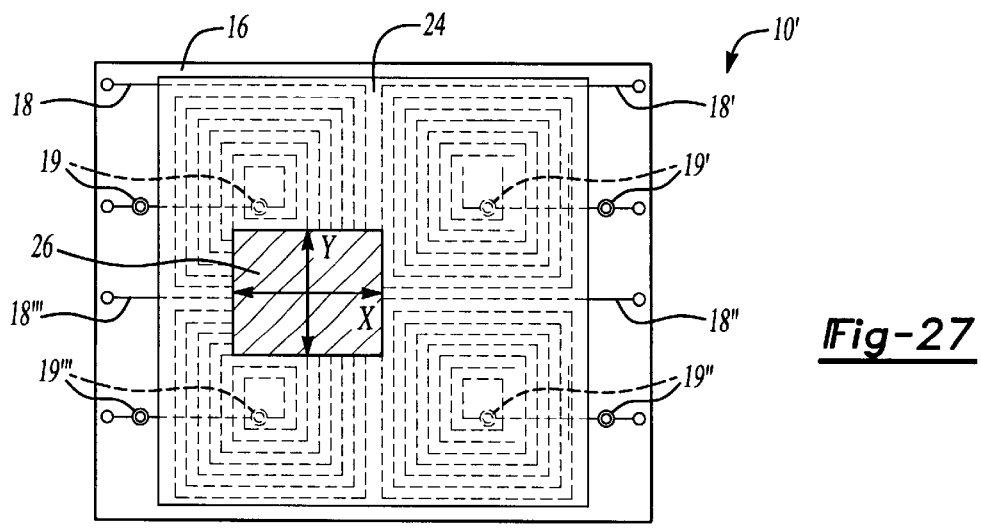
FIG. 27 illustrates a third embodiment of a two-dimensional position sensor.

Referring to FIG. 27, four essentially square wound coils form a square, a core coating covers all of the coils, and a magnet of the same size as each coil travels over said coils.

Figure 28:
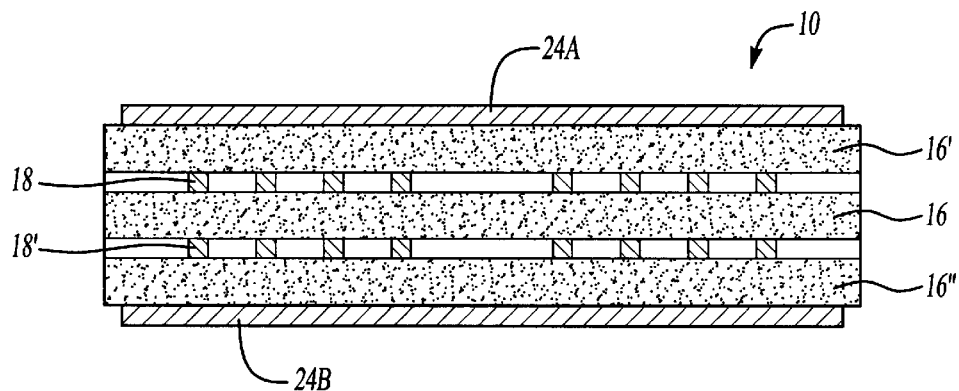
FIG. 28 shows a section of the sensor components.

Referring to FIG. 28, the manufacturing process of the above described sensors, in their various configurations, comprises in principle the creation of a sandwich comprising a multilayer printed circuit bearing at least one core coat in ferromagnetic material of predetermined magnetic characteristics. The insulating substrate 16 which carries the coil(s) 18 is for example of a synthetic epoxy or polyimide material type. As an order of magnitude, this substrate 16 may be a few centimeters long and approx. 1 centimeter wide with a thickness of 0.1 mm. It is obvious that this coat may be selected flexible or to the contrary rigid (thicker), according to the stresses of the sensor in each application.

In a particular design, the coils 18 are made by an engraving, in the shape of very elongated copper tracks, deposited on the substrate plate 16. They typically comprise half a dozen turns. These coils 18 are covered on their outside surface by a new insulating coat 16', 16" similar to substrate 16 in dimension and material. A filling material 30 of a type known to the craftsman is naturally introduced between the coil 18 tracks, before depositing a new insulating coat 16', 16", for example by gluing or any other classical method.

The manufacturing of this multilayer printed circuit comprising two coils 18, 18' is of a classical nature and will not be detailed in continuation. Then a core coat 24, made of a high permeability material (typically 100,000 times higher that of air) and with low saturation field (typically 0.8 T) is deposited on at least one external face of the insulation 3+coils 18, 18' composite (FIG. 28).

The high permeability material used is for example actual mumetal (Nickel Iron alloy) or an amorphic material (also called metallic glass) or as well a typically Cobalt based nanocrystalline alloy. The core coat 24 is of the order of 20 to 50 microns, to allow for a saturation by a low external magnetic field. According to the type of sensor that we want to realize, it is possible to realize different forms of core coat: core coat in a triangular shape or presenting stepped width, even local shrinkage, core coat in an arc of a circle shape, possibly pointed, core coat with hatching or with more or less thick or tight grains. The core coat 24 is for example realized by chemical process (deposition), or by gluing, in this case being precut then glued in a classical way.

Alternatively, the deposition process is a colamination, the core coat 24 shape being obtained for example by an addition or subtraction process of a known type, according to the required sensor shape.

A deposition by engraving or silk screening is possible, per a known procedure. To improve its electrical conductivity or its weldability, the ferromagnetic material may possibly and selectively be coated by another metal per a procedure known to the craftsman. This is especially usefull if the mumetal has to be used as conductive track. It may be advantageous to apply a treatment to improve its adherence to the support before gluing, for example by depositing a thin gold coat, then copper then a step of oxidizing the copper. Preferably varnish to protect the core coat 8 is applied, to reduce the mechanical stress and to insulate the ferromagnetic coat.

As a variant of the ferromagnetic coat deposition process, the material used is pulverized and mixed to a polymer paste, so that it can then be easily deposited on the coils.

As a further variant, it is also possible to modify, after deposition, the magnetic characteristics of a core coat 24, by localized mechanical stress or by laser treatment, as the local heating will destroy the mumetal magnetic properties in particular. Such a treatment is for example suitable to correct manufacturing mistakes (linearity mistakes or setting of the output signal of the sensor). It is also obvious that the assembly of the circuit by gluing elementary sub-circuits obtained by the process described above is also feasible by a gluing method known to the craftsman.

As a production variant to reduce the number of ferromagnetic material coats to be produced, a very flexible type of circuit is chosen, two coils 18, 18' are made one next to the other on a substrate 16, then the printed circuit is folded in two after deposition of the core coat 24, the two cores being then in parallel and face to face, separated by a coat of glue, to obtain a core coat on both faces of coils 18, 18'. A separation is created between both sides of the core coat 24.

Figure 29:
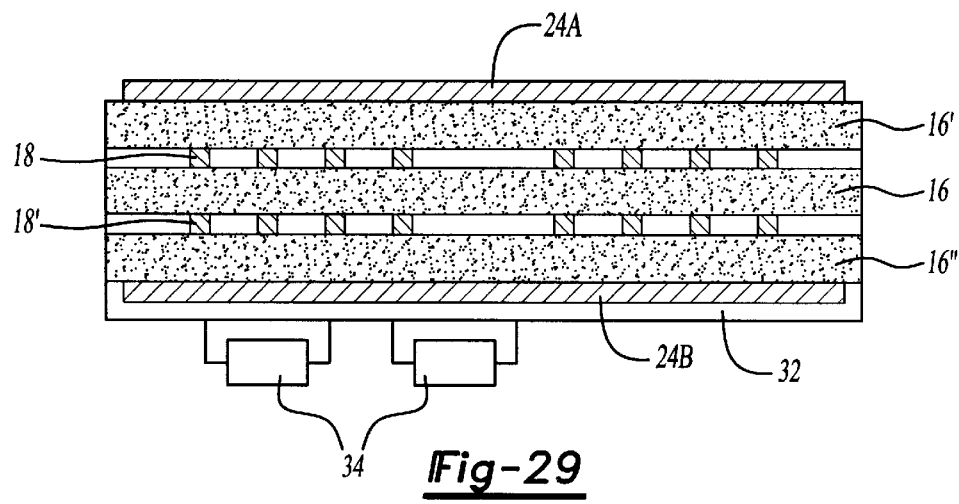
FIG. 29 shows an alternative incorporating electronic components.

The sensor system 10 is typically made in the shape of a thin sheet, for example approximately 0.5 mm. It is obvious that it is possible to utilize the same multilayer circuit, outside the area of coils and the core coats 24A, 24B to design conductive tracks adapted to the creation of electronic circuits, components 39 being then implanted on one or both faces of the printed circuit. As a production variant, a new insulating coat 32 is deposited on the core coat 8, and copper conductive tracks engraved thereon so that components 13 can be implanted (FIG. 29)

As another production variant not represented, at least part of a core coat 24 is used as support for components 34 (with suitable treatment), outside the area of coils 18, 18'. In this case, the first part of core coat 24, used in the role of position sensor is connected to the mass of the signal treatment electronic device, and the second part which carries the components 34 and conductive tracks is not connected to this same mass. Two different zones are then created one next to the other in the core coat, with a separation.

Figure 30:
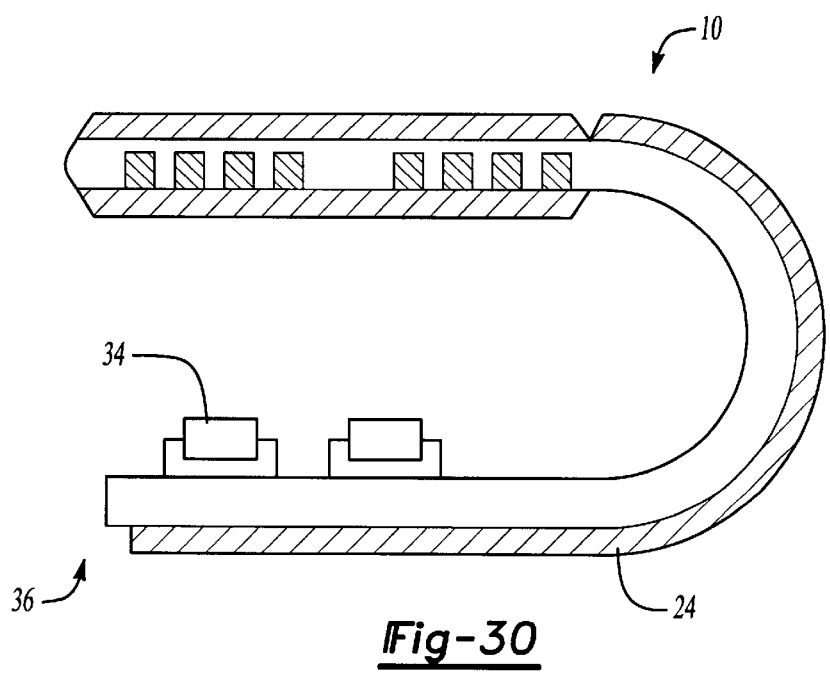
FIG. 30 shows a particular application of the invention.

Preferably, in the case of a flexible sensor, (with thin substrate 16), a first zone being the position sensor itself, with two core coats 24A, 24B (FIG. 30), and a second zone 36 in which the components 34 are implanted on a substrate supporting a ferromagnetic material coat 8, we can fold the circuit around these components 34, to offer them an excellent electromagnetic shielding. It is obvious that these components 34 may for example constitute the electronic circuit for the sensor 10 signal.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed:

1. A position sensor system comprising:
    first part comprising a coil and a core layer on a substrate, said core layer covering at least a portion of said coil; and
    a second part comprising a magnet movable substantially parallel to said coil, said magnet operable to generate a field of greater magnitude than said core layer over an area substantially equivalent to said core layer such that said field defines a relative position of said first part relative said second part.

2. The sensor or claim 1, further comprising a device for measuring induction connected to a terminal of said coil.

3. The sensor of claim 1, wherein said coil includes a first and a second coil positioned on said substrate, said first coil supplied with an alternating current, and a device for measuring voltage connected to a terminal of said second coil.

4. The sensor of claim 1, wherein said magnet includes a first and a second core layer, said first layer arranged on a first side of said coil and said second layer arranged on an opposite side of said coil.

5. The sensor of claim 1, where in said coil includes a plurality of parallel windings each separated by an insulator.

6. The sensor of claim 1, wherein said core layer is electrically connected to an electrical ground.

7. The sensor of claim 1, wherein said coil is shaped as an arc of circle.

8. The sensor of claim 1, wherein said core layer includes a plurality of coplanar core layers spaced over said coil.

9. The sensor of claim 1, wherein said core layer includes a pointed shape.

10. The sensor of claim 1, wherein said core layer includes a local constriction.

11. The sensor of claim 1, wherein said core layer include a thickness that varies axially.

12. The sensor of claim 1, wherein said core layer includes a number of inclined cuts that are electrically interconnected.

13. A sensor according to claim 1, wherein said coil is of a substantially arcuate shape.

14. A device according to claim 1, wherein said core layer is shaped to generate a predetermined output signal from said coil relative a position of said first part relative said second part.

15. A device according to claim 1, wherein said core layer comprises a substantially triangular member.

16. A device according to claim 1, wherein said core layer comprises a plurality of independent members.

17. A position sensor system comprising:
    a first part comprising core layer having first and a second coil and a core layer on a substrate, said first and second coil having a coupling therebetween, said first coil and said second coil are located on opposite sides of said core layer, saturation of said core layer by said magnet creating said coupling between said first and second coil;
    an alternating current source connected to said first coil;
    a signal processing device connected to said second coil and;
    second part comprising a magnet movable substantially parallel to said first part to alter said coupling said magnet operable to generate a field of greater magnitude than said core layer over an area substantially equivalent to said core layer such that said field defines a relative position of said first part relative said second part.

18. A position sensor system comprising:
    first part comprising a core layer having a first and a second coil and a core layer on a substrate, said first and second coil having a coupling therebetween;
    an alternating current source connected to said first coil;
    a signal processing device connected in said second coil, layer includes a first and a second core layer located on opposite sides of said substrate such that movement of said magnet reduces said coupling between said first and said second coil; and
    a second part comprising a magnet movable substantially parallel to said first part to altar said coupling said magnet operable to generate a field of greater magnitude than said core layer over an area substantially equivalent to said core layer such that said field defines a relative position of said first part relative said second part.

\* \* \* \* \*